United States Patent
Auffray

(10) Patent No.: US 11,319,090 B2
(45) Date of Patent: May 3, 2022

(54) SYSTEM AND METHOD FOR DETERMINING THE SEPARATION BETWEEN TWO PARTS USING EDDY CURRENT SENSORS

(71) Applicant: Airbus Operations SAS, Toulouse (FR)

(72) Inventor: Stéphane Auffray, Saint Lypard (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 111 days.

(21) Appl. No.: 16/718,695

(22) Filed: Dec. 18, 2019

(65) Prior Publication Data
US 2020/0198804 A1  Jun. 25, 2020

(30) Foreign Application Priority Data

Dec. 20, 2018 (FR) ...................................... 1873572

(51) Int. Cl.
*B64F 5/60* (2017.01)
*B64F 5/10* (2017.01)
*B23P 19/10* (2006.01)
*G01N 27/9013* (2021.01)
*G01N 27/90* (2021.01)

(52) U.S. Cl.
CPC ................ *B64F 5/10* (2017.01); *B23P 19/10* (2013.01); *B64F 5/60* (2017.01); *G01N 27/902* (2013.01); *G01N 27/9006* (2013.01); *B23P 2700/01* (2013.01); *G01N 2291/2694* (2013.01)

(58) Field of Classification Search
CPC .......................... B64F 5/60; G01N 2291/2694
See application file for complete search history.

(56) References Cited

U.S. PATENT DOCUMENTS 7,292,029 B2 * 11/2007 Feikert ................. G01N 27/902
                                                              324/228
7,737,515 B2 *  6/2010 Ravindra ................ H01L 24/95
                                                              257/422
2012/0130528 A1  5/2012 Stark et al.

FOREIGN PATENT DOCUMENTS

| CN | 207026319 U | 2/2018 |
| DE | 102009018991 A1 | 11/2010 |
| EP | 2883797 A1 | 6/2015 |
| JP | 2002160077 A * | 6/2002 |
| JP | 2002160077 A | 6/2002 |

OTHER PUBLICATIONS

JP-2002160077-A english translation (Year: 2002).*
French Search Report; priority document.

* cited by examiner

*Primary Examiner* — Jason L Vaughan
*Assistant Examiner* — Amanda Kreiling
(74) *Attorney, Agent, or Firm* — Greer, Burns & Crain, Ltd.

(57) ABSTRACT

A system for assembling two parts, in particular parts forming the fuselage or the wings of an aircraft, includes a positioning aid guiding positioning tools so as to juxtapose the two parts at the level of an assembly zone. The assembly system further includes a set of eddy current sensors positioned in at least one of the two parts to determine the separation of the two parts at the level of the assembly zone. If the separation does not conform to a predetermined criterion the positioning tools move at least one of the parts.

10 Claims, 3 Drawing Sheets

SYSTEM AND METHOD FOR DETERMINING THE SEPARATION BETWEEN TWO PARTS USING EDDY CURRENT SENSORS

CROSS-REFERENCES TO RELATED APPLICATIONS

This application claims the benefit of the French patent application No. 1873572 filed on Dec. 20, 2018, the entire disclosures of which are incorporated herein by way of reference.

FIELD OF THE INVENTION

The present invention concerns a system and a method for assembling at least two parts such as parts forming the fuselage or the wings of an aircraft.

The invention therefore finds its application in operations of assembling large parts used to form the fuselage or the wings of an aircraft.

BACKGROUND OF THE INVENTION

The parts to be assembled may be fuselage sections, for example. During their assembly, the parts are brought into contact and then fixed together. The parts are generally positioned by superposition at the level of an assembly zone where the fixing of the parts is carried out.

The assembly of the parts forming the fuselage or the wings of the aircraft is carried out rigorously and precisely and the separation between the assembled parts at the level of the assembly zone must not exceed predefined values in order, inter alia, to guarantee stable fixing of the parts.

At present the formation of the fuselages or the wings is automated. Accordingly, positioning tools effect the positioning of the parts in proximity to one another, or in immediate proximity, in the assembly zone. The positioning tools are aided by positioning aid or assistance means.

The positioning aid or assistance means typically include instruments for measuring lengths such as laser trackers also known as plotting or locating lasers. The length measuring instruments are positioned and configured so as to emit signals intended to reach targets situated in the parts to be assembled.

The targets may be either locating points in the parts or elements positioned on the parts to be assembled, for example, reflecting targets.

During assembly of the two parts the laser tracker interacts with the targets so that the positioning aid or assistance means determine the positioning of the targets and consequently of the parts to be assembled. The positioning tools are therefore guided by the positioning aid means until the parts are disposed in the proximity of one another in a predefined assembly position. The predefined assembly position must be understood as a position of the parts in which the parts can be fastened together.

Once the parts are placed in the predefined assembly position, in which the parts are juxtaposed, an operator evaluates manually the separation between the two parts at the level of the assembly zone. In the case pf parts forming part of an aircraft fuselage, such as fuselage sections, this value is defined as the local distance between the skins of two fuselage sections to be assembled. The operator may use for this operation either calibrated shims or devices provided with probes measuring the separation between the parts.

In the case of probes, they are introduced between the parts to perform this type of measurement. In both cases, the separation between the two parts is measured by acquisitions termed intrusive, meaning that the measurement action may interact with assembly or in other words modify the separation of the skins during the measuring operation.

This operation is repeated as many times as necessary and, as a function of the results obtained, the parts are moved or not by the positioning tools so that the parts are assembled without exceeding predetermined separation values.

Once the parts are positioned so as not to exceed a predetermined value of the separation between them, the parts are fastened together, for example by tacking, then by drilling and riveting.

Verification of the separation of the parts is therefore an operation carried out locally and manually by an operator.

SUMMARY OF THE INVENTION

An object of the present invention is to reduce intervention by the operators in order to improve the process of assembling the parts, such as two parts of the fuselage or of the wings of an aircraft.

To this end, in accordance with a first aspect the present invention concerns a system for assembling at least two parts, in particular parts forming the fuselage or the wings of an aircraft, including means for aiding the positioning of the parts and control means configured to control the positioning tools as a function of signals emanating from the positioning aid means so as to juxtapose the at least two parts at the level of an assembly zone.

The assembly system further includes a set of eddy current sensors intended to be positioned in at least one of the at least two parts, the control means being configured to acquire signals emanating from the sensors of the set of sensors to determine the separation of the at least two parts at the level of the assembly zone on the basis of the signals acquired and to generate commands addressed to the positioning tools to move at least one of the parts if the separation does not conform to a predetermined criterion.

Due to the proposed assembly system, in addition to positioning the parts in a position in which they can be fastened together, the separation between the parts can be verified automatically during operations to assemble the parts. The intervention of an operator is therefore avoided, which reduces the duration of the assembly operations and improves the reliability of the verifications.

The duration of an operation to assemble two parts is further reduced when a plurality of separation measurements may be carried out at the same time at different locations.

Moreover, the signals emanating from the sensors and the separations determined may be stored so as to enable tracking of that data in the assembly operations.

Moreover, the eddy current sensors enable determination of the separation by non-destructive testing methods (known as NDT methods).

It will be noted that eddy current sensors are used nowadays for some verifications in the aeronautical field such as detection of cracks or areas of corrosion and measurement of the thickness of metal substrates or coatings, but are not used to measure separations in assembly operations.

In accordance with other possible features, separately or in combination with one another:
  if the separation determined conforms to a predetermined criterion the separation is less than or equal to a predetermined separation value;

the means for aiding positioning of the parts include targets intended to be positioned on at least one of the at least two parts, the eddy current sensors being respectively disposed in proximity to the targets;

the eddy current sensors are respectively connected to targets of the positioning aid means and are connected via a computer assisted design (CAD) tool used by the control means;

the assembly system further includes means for generation of eddy currents, acquisition and processing of signals emanating from the eddy currents sensors and multiplexing means disposed between the set of sensors and the generation, acquisition and processing means, the generation, acquisition and processing means being configured to generate an electromagnetic wave addressed to the sensors of the set and to acquire and to process signals emanating from the eddy current sensors.

In accordance with a second aspect, the present invention concerns a method of assembling at least two parts, such as parts forming the fuselage or the wings of an aircraft, including positioning the at least two parts so that they are juxtaposed in an assembly zone using positioning tools guided by positioning aid means. The assembly method further includes steps of:

acquisition of signals emanating from respective eddy current sensors situated at various locations on at least one of the parts;

determination of the separation between the at least two parts positioned at the level of the assembly zone on the basis of the acquired signals; and generation of commands addressed to the positioning tools to move at least one of the at least two parts if the separation determined does not conform to a predetermined criterion.

In accordance with other possible features, separately or in combination with one another:

if the separation determined conforms to a predetermined criterion the separation is less than or equal to a predetermined separation value;

the step of generation of commands is executed until the separation determined conforms to the predetermined criterion;

the at least two parts are two fuselage sections.

In accordance with a third aspect, the present invention concerns the use of an assembly system according to the invention using the assembly method according to the invention for the formation of a fuselage or the wings of an aircraft.

The assembly method and the use of the assembly system have features and advantages analogous to those described above with reference to the assembly system.

BRIEF DESCRIPTION OF THE DRAWINGS

Other particular features and advantages will become more clearly apparent in the following detailed description.

In the appended drawings, provided by way of nonlimiting example.

DETAILED DESCRIPTION OF THE PREFERRED EMBODIMENTS

The invention finds its application in operations to assemble large parts used for the formation of a fuselage or the wings of an aircraft. In the following description, references are made to parts forming part of an aircraft fuselage, such as fuselage sections. The description nevertheless applies to other parts forming part of an aircraft, for example parts forming the wings of the aircraft or any other part having a skin where a predetermined separation between the skin and that of another part is tolerated.

Figure 1:
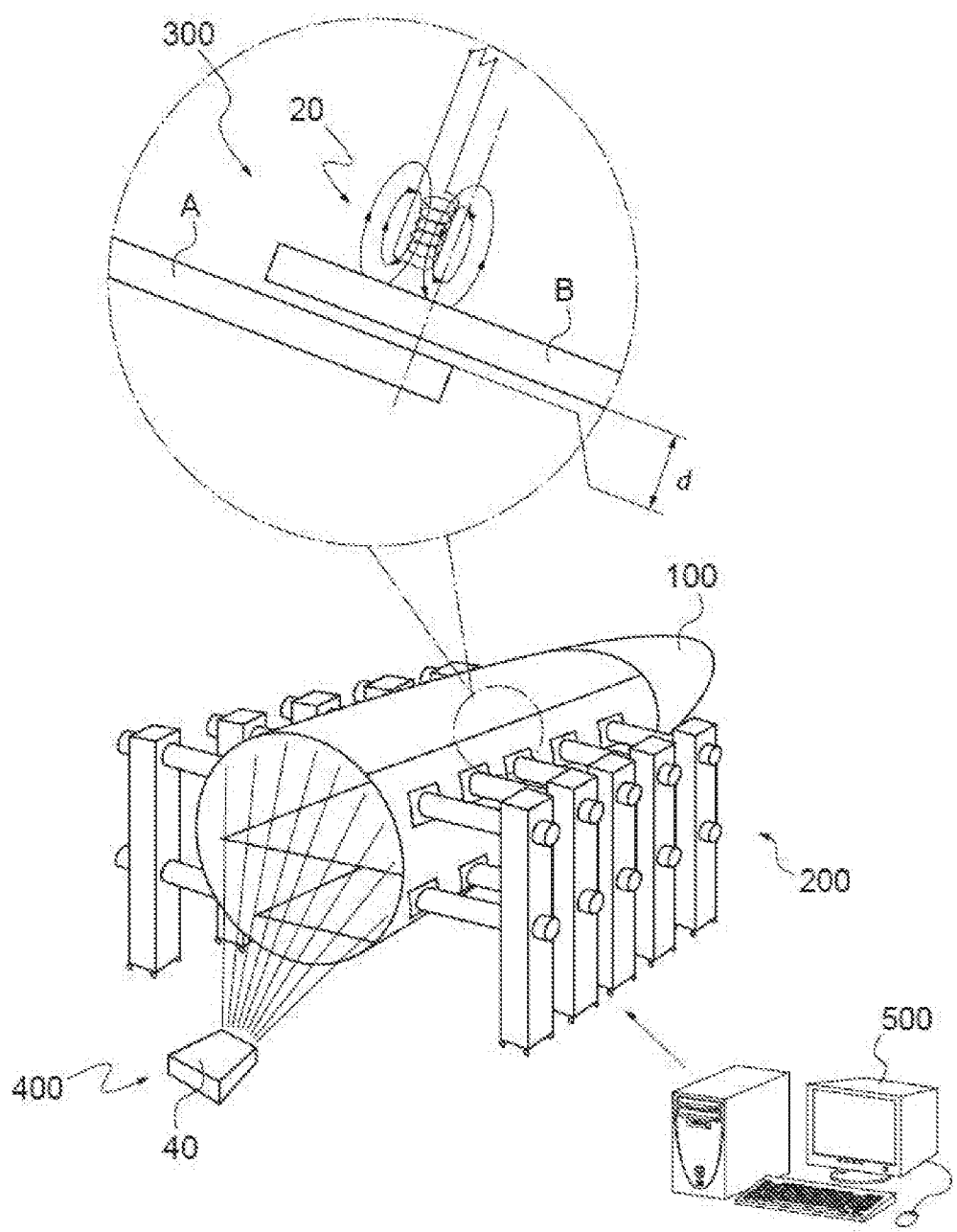
FIG. 1 is a diagram showing one embodiment of a system for assembling two parts used for the formation of an aircraft fuselage.

FIG. 1 represents a part of a fuselage 100 of an aircraft in a phase of assembling various parts forming the fuselage 100. By way of nonlimiting example, the fuselage is a monocoque fuselage. In particular, FIG. 1 represents constraints regarding positioning a longitudinal seam. The parts A, B must be fastened on a boundary plane. That boundary plane defines the positioning of the parts A, B relative to one another and the tolerated separation between them. As described hereinafter, the separation or fitting clearance is determined by the eddy current sensors. The fuselage 100 is supported by support elements 200. The parts forming the fuselage 100 are assembled together using an assembly system. One embodiment of the assembly system is described hereinafter with reference to FIGS. 1 and 2.

A detail of the fuselage is shown in FIG. 1. That detail represents the assembly zone 300 of the parts A, B, i.e., the zone in which the parts A, B will be fastened together. In the example shown the parts A, B are juxtaposed or positioned in immediate proximity at the level of the assembly zone 300. There is a separation d between the parts A, B in this assembly zone 300.

In accordance with one embodiment the system for assembling at least two parts A, B includes means 400 for aiding positioning of the parts A, B generating signals relating to the position of the parts A, B. Those signals are used to control the movement of positioning tools in order to position the parts A, B at particular locations. The positioning tools, guided by positioning aid means, are means known to the person skilled in the art.

During assembly operations the positioning tools (not represented in the figure) are used to assemble or to fit together the parts. It will be noted that when the parts must be assembled so as to be fixed relative to one another the positioning tools position the parts so as to juxtapose them or to position them in immediate proximity at the level of the assembly zone 300. The parts A, B are fixed together at the level of an assembly zone 300.

In other words, the assembly zone 300 of a part corresponds to the portion of the part that is fixed to another part, that is to say, the zone or portion where fixing means are to be installed so as to fasten one part A to another part B.

The positioning tools are guided in operation by control means 500 generating commands addressed to the positioning tools as a function of the signals emanating from the positioning aid tools 400. The control means 500 are configured to control the operation of the assembly system.

In one embodiment, the means 400 for aiding positioning of the parts A, B include a length measuring instrument 40 enabling determination of the position of at least one part A, B.

It will be noted that if one of the parts A, B is fixed, and its position is therefore known, the positioning aid means 400 are able to determine the position of the second part that is to be assembled to the first part.

The means 400 for positioning the parts further include at least one target intended to be positioned on at least one of the parts A, B.

A target may be formed by a predefined location in at least one of the parts A, B or may include an element intended to be positioned on at least one of the parts A, B.

The length measuring instrument 40 interacts with the targets so as to determine the position of at least one of the parts A, B. The positioning tools are controlled as a function of the positions determined to position the parts A, B in the assembly position.

The positioning tools and the positioning aid means 400 are known to the person skilled in the art and are not further described here.

In one embodiment, the assembly system includes means for determining the separation between the two parts A, B at the level of the assembly zone 300 of the parts A, B.

In one embodiment, the determination means include a set of eddy current sensors 20. In order to simplify the figures only one sensor 20 is represented diagrammatically in FIG. 1 in the detail showing the assembly zone 300. The determination means nevertheless include a plurality of eddy current sensors 20 distributed in the surface of the parts A, B at the level of the assembly zone 300 in order reliably to determine the separation d between the two parts A, B.

In one embodiment, the eddy current sensors 20 are linked to the positions of the targets of the positioning aid means 400.

The positioning of the targets is governed by a control plan. The control plan comprises rules and dimensions enabling correct positioning of the parts. In particular the control plan defines the predetermined separation.

In this embodiment, installation of the assembly system is therefore facilitated once the targets of the positioning means 400 and the eddy current sensors 20 are simultaneously positioned on the parts A, B.

In other embodiments, the eddy current sensors are positioned directly on the parts, independently of the targets, by non-permanent fixing means such as gluing means or flexible tools to be positioned on the structure.

Figure 2:
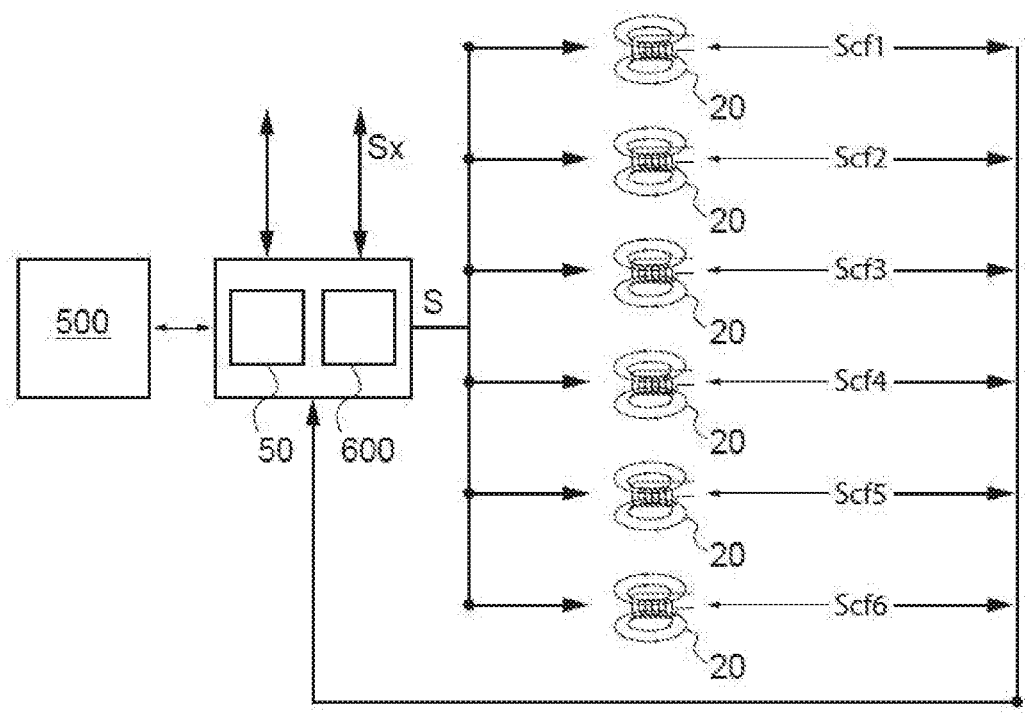
FIG. 2 is a diagram showing the assembly system in accordance with one embodiment of the invention.

FIG. 2 shows elements of the assembly system, in particular of the means in accordance with one embodiment for determination of the separation d.

In accordance with one embodiment, the assembly system, in particular the means for determining the separation d of the two parts A, B, includes means for generation of eddy currents and acquisition and processing 50 of signals emanating from the eddy current sensors 20. In order to simplify the description the means 50 for generating eddy currents and acquisition and processing of signals emanating from the eddy current sensors 20 are referred to as generation means 50 in the following description.

FIG. 2 shows, by way of nonlimiting example, six eddy current sensors 20. Of course, the number of sensors 20 may be different, the number thereof being determined on a case by case basis as a function of the parts to be assembled.

The eddy current sensors are connected via a computer assisted design (CAD) tool. The CAD tool is used by control means 500.

The eddy current generator 50 is configured to generate a signal S addressed to the eddy current sensors 20 of the set. The signal is, for example, an electromagnetic wave. As in the preceding figure, in order to simplify the figure only one eddy current sensor 20 is shown.

The assembly system further includes multiplexing means 600 disposed between the generation means 50 and the set of eddy current sensors 20. The multiplexing means 600 enable the electromagnetic wave generated by the generation means 50 to reach each of the eddy current sensors 20 disposed on at least one of the two parts A, B.

The incidence of the electromagnetic wave S generated by the generation means 50 on each of the eddy current sensors 20 modifies at least one of the parameters of the sensors 20. In one embodiment, the eddy current sensors 20 include a coil and generate in response to reception of the electromagnetic wave S a signal SCF representing an impedance variation of the coil, for example a voltage difference. That impedance variation represents the value of the separation d between the parts A, B. Each eddy current sensor 20 emits a signal SCF, all of the signals being acquired by the control means via the multiplexing means.

The multiplexing means or multiplexers therefore enable distribution of the electromagnetic wave S generated by the generation means 50 to each eddy current sensor 20 and acquisition of the signals SCF emanating from each eddy current sensor 20 generated in response to the electromagnetic wave.

The control means 500 are further configured to determine the separation d between the parts A, B as a function of the signals SCF emanating from the set of eddy current sensors 20 as a function of the separation d determined.

In accordance with one embodiment, the commands generated by the control means 500 are intended to command the movement of at least one of the parts A, B if the separation d determined does not conform to a predetermined criterion.

In one embodiment, a separation d conforms to a predetermined criterion when the separation is less than or equal to a predetermined separation value.

Thus the control means 500 generate commands for moving at least one of the parts A, B if the separation d determined is greater than the predetermined separation value.

In an embodiment such as that represented in FIG. 2, the control means 500 may receive signals Sx emanating from additional sensors, those sensors being of different types to the eddy current sensors, such as ultrasound sensors. The type and the number of sensors represented are given by way of illustration and are in no way limiting on the invention. Of course, in accordance with embodiments, some of the additional sensors may be present or not and, when present, be different in number.

In one embodiment, the control means 500 include an interface module or human-machine interface (HMI) including means for displaying data relating to the positioning and to the separation of the parts A, B. For example, an operator can therefore monitor the assembly operation, modify parameters and verify results.

Figure 3:
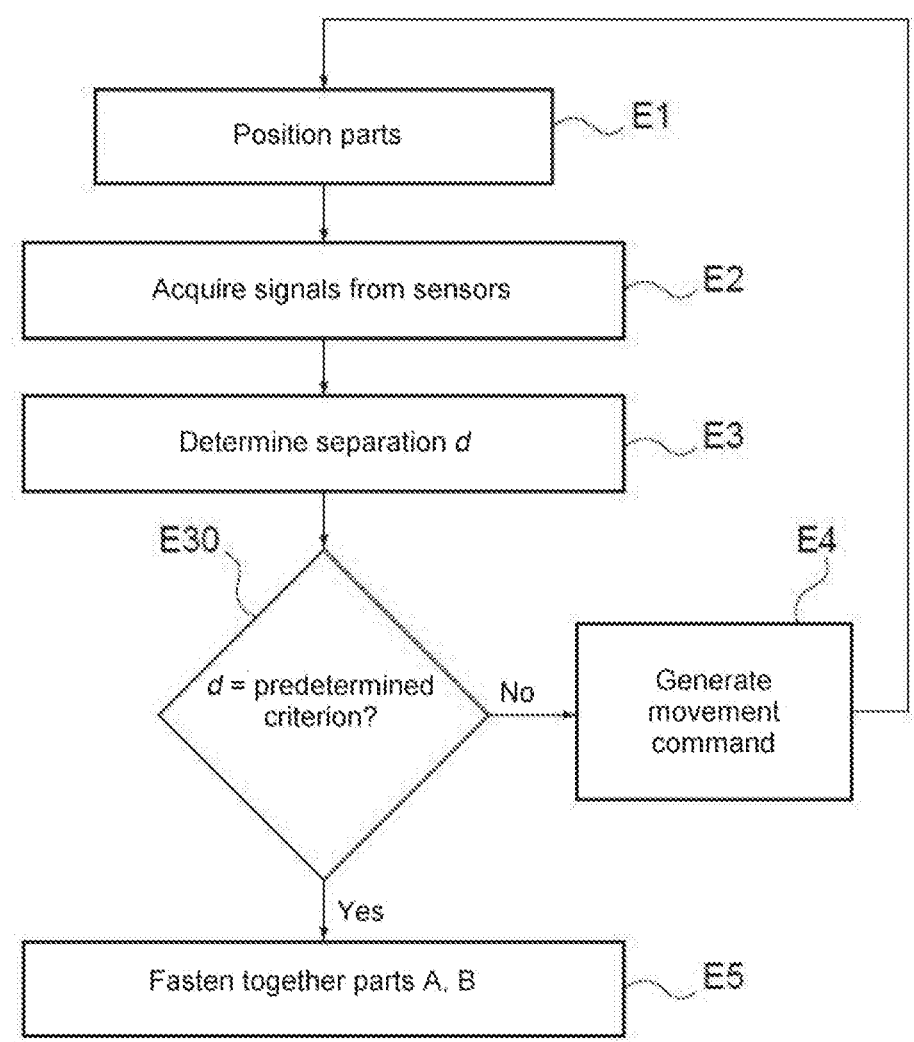
FIG. 3 is a diagram showing steps of the method in accordance with one embodiment of the invention for assembling two parts.

FIG. 3 shows steps of the method for assembling at least two parts conforming to one embodiment of the invention.

The method begins with a step E1 of positioning the parts A, B during which the parts A, B are positioned so as to be juxtaposed in an assembly zone 300. As indicated hereinabove the parts A, B are positioned in immediate proximity or juxtaposed using positioning tools that are guided by positioning aid means 400. The positioning aid means 400 guide the positioning tools as a function of the control plan.

Once the parts A, B are positioned so that they can be fastened together, the separation between the two parts A, B at the level of the assembly zone 300 is determined. To carry out this determination a plurality of eddy current sensors 20 are respectively positioned at a plurality of locations in at least one of the parts A, B.

In one embodiment, the part on which the eddy current sensors 20 are placed is the outermost part B.

Of course, in other embodiments, the part on which the sensors are placed could be the innermost part or sensors could be positioned on both parts.

During an acquisition step E2 the signals SCF emanating from respective sensors 20 of the set of sensors are acquired by the control means 500. Thereafter a step E3 of determining the separation d between the parts A, B at the level of the assembly zone 300 is executed to determine the separation d from the acquired signals SCF.

In one embodiment, if the separation d determined does not conform to a predetermined criterion (defined for example by the control plan) the method includes the generation E4 of the commands addressed to the positioning tools to move at least one of the parts A, B. The conformance of the separation value d determined, or the comparison of that value with a predetermined separation value, is carried out during a step E30 of verification of the separation d.

In one embodiment, the separation conforms to a predetermined criterion if it is less than or equal to a predetermined separation value. The step E4 of generating commands is therefore executed if the separation determined is greater than a predetermined separation value.

The command generated in the generation step E4 is addressed to the positioning tools that execute the positioning step E1 again. The acquisition step E2, the determination step E3 and the verification step E30 are also executed again.

In an assembly method in accordance with one embodiment, the step E4 of generating the commands is executed until the separation determined conforms to the predetermined criteria. In other words, the positioning tool positions the parts A, B to be assembled guided by the positioning aid means and by the separation determination means until the position of the parts A, B is the predefined position and the separation d determined at the level of the assembly zone 300 is less than or equal to a predetermined separation value so that the parts A, B can be fastened together.

In one embodiment, if the separation d determined in the determination step E3 conforms to the predetermined criterion (or is less than a predetermined separation value) the positioning of the parts is therefore finished, and the operation E5 of fastening the parts together may be executed.

In one embodiment, the assembly system includes memory means (not represented in the figures) on which is stored various data relating to the positioning of the parts and the determination of the separation, such as data emanating from the eddy current sensors 20. Consequently, different values obtained by using the method can be saved to enable tracking of data that can be used in operations subsequent to assembling the parts A, B.

The assembly method described hereinabove may be implemented using an assembly system conforming to embodiments such as that represented by the figures for assembling parts of a fuselage 100 or of the wings (not shown) of an aircraft.

Thus, the parts are assembled two by two until the fuselage 100 or the wings are formed.

In accordance with one embodiment, the method includes preliminary calibration of the means for determining the separation d using the signals SCF emanating from the sensors 20. In fact, the response of the eddy current sensors 20 may vary as a function of the materials from which the parts A, B to be assembled are made.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for assembling at least two parts comprising:
   positioning aids configured to aid a positioning of the parts,
   a controller comprising a memory containing a predetermined separation criterion and configured to control positioning tools as a function of signals emanating from the positioning aids to juxtapose said at least two parts at a level of an assembly zone,
   a set of eddy current sensors configured to be positioned in at least one of said at least two parts,
   said controller being configured to acquire signals emanating from sensors of the set of eddy current sensors to determine a separation of said at least two parts at the level of the assembly zone based on the signals acquired and to generate commands addressed to the positioning tools to move at least one of the parts if the separation does not conform to the predetermined separation criterion,
   wherein said eddy current sensors are respectively connected to targets of the positioning aids and are connected via a computer assisted design tool used by the controller.

2. The assembly system according to claim 1, wherein the parts comprise parts forming a fuselage or wings of an aircraft.

3. The assembly system according to claim 1, wherein if the separation determined conforms to the predetermined criterion, the separation is less than or equal to a predetermined separation value.

4. The assembly system according to claim 1, further including a means for generation of eddy currents, acquisition and processing of signals emanating from the set of eddy currents sensors and a means for multiplexing disposed between the set of sensors and said means for generation, acquisition and processing, said means for generation, acquisition and processing being configured to generate an electromagnetic wave addressed to said sensors of the set of sensors and to acquire and to process signals emanating from the eddy current sensors.

5. A method of assembling at least two parts including positioning said at least two parts so that they are juxtaposed in an assembly zone using positioning tools guided by positioning aids, said assembly method comprising the steps of:
   acquiring signals emanating from respective eddy current sensors situated at various locations on at least one of said parts;

determining a separation between said at least two parts positioned at a level of the assembly zone based on the acquired signals; and generating commands addressed to the positioning tools to move at least one of said at least two parts if the separation determined does not conform to a predetermined criterion, wherein said eddy current sensors are respectively connected to targets of the positioning aids and are connected via a computer assisted design tool used by A controller.

6. The method according to claim 5, wherein said two parts comprise parts forming a fuselage of an aircraft.

7. The method according to claim 5, wherein said two parts comprise parts forming wings of an aircraft.

8. The method according to claim 5, wherein if the separation determined conforms to the predetermined criterion the separation is less than or equal to a predetermined separation value.

9. The method according to claim 5, wherein the step of generating commands is executed until the separation determined conforms to the predetermined criterion.

10. A system for assembling at least two parts comprising:
positioning aids configured to aid a positioning of the parts,
a controller comprising a memory containing a predetermined separation criterion and configured to control positioning tools as a function of signals emanating from the positioning aids to juxtapose said at least two parts at a level of an assembly zone,
a set of eddy current sensors configured to be positioned in at least one of said at least two parts,
said controller being configured to acquire signals emanating from sensors of the set of eddy current sensors to determine a separation of said at least two parts at the level of the assembly zone based on the signals acquired and to generate commands addressed to the positioning tools to move at least one of the parts if the separation does not conform to the predetermined separation criterion,
wherein the positioning aids include targets configured to be positioned on at least one of said at least two parts, said eddy current sensors being respectively disposed in proximity to said targets.

* * * * *